Figure 1:
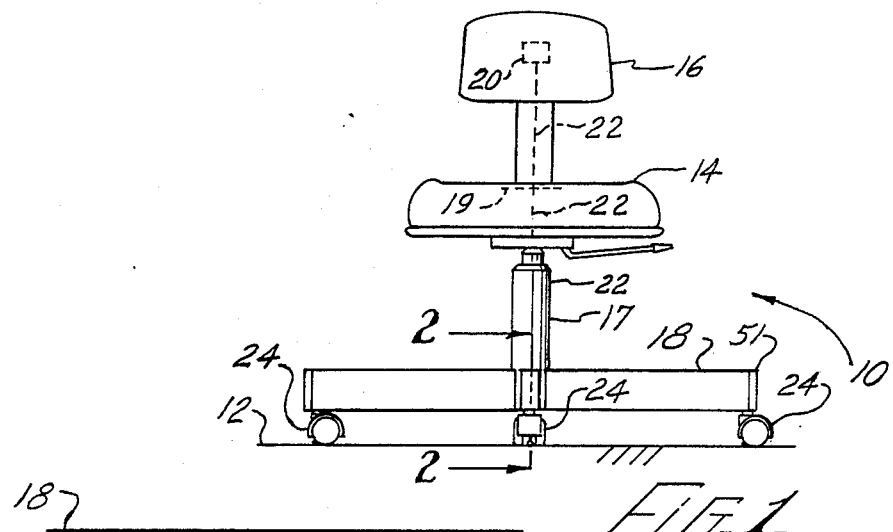

United States Patent [19]

Lissner

[11] Patent Number: 4,934,022
[45] Date of Patent: Jun. 19, 1990

[54] CONDUCTIVE CASTER

[76] Inventor: Jay D. Lissner, 5250 Briggs Ave., La Crescenta, Calif. 91214

[21] Appl. No.: 336,659

[22] Filed: Apr. 11, 1989

[51] Int. Cl.⁵ ............................................. B60B 33/00
[52] U.S. Cl. ....................... 16/18 R; 16/47; D8/375; 361/219
[58] Field of Search ............... 16/18 R, 37, 38, 47, 16/48; 361/217, 219, 220, 212, 218, 221; 152/DIG. 2; D8/375

[56] References Cited

U.S. PATENT DOCUMENTS

| | | | |
|---|---|---|---|
| 2,216,363 | 10/1940 | Crawford | 361/219 |
| 2,524,163 | 10/1950 | Criss | 16/18 R |
| 2,753,491 | 7/1956 | Legge | 361/219 |
| 2,985,799 | 5/1961 | Steele | 361/219 |
| 4,625,257 | 11/1986 | Lissner | 361/212 |
| 4,747,011 | 5/1988 | Lissner | |
| 4,754,364 | 6/1988 | Speet et al. | 361/220 |
| 4,763,383 | 8/1988 | Estkowski et al. | 16/18 R |
| 4,773,122 | 9/1988 | Wilcox | 16/18 R |
| 4,807,328 | 2/1989 | Hezel | 16/18 R |

OTHER PUBLICATIONS

Catalog, Ball Chain Manufacturing Company, Inc., cover page, 5 pages, no date.

*Primary Examiner*—Nicholas P. Godici
*Assistant Examiner*—Edward A. Brown
*Attorney, Agent, or Firm*—Sheldon & Mak

[57] ABSTRACT

A conductive caster for grounding a conductive wheeled chair having a seat and back with conductive elements which are electrically connected to a source of ground potential through the chair, the conductive caster including a caster body, caster wheels which movably support the caster body on a floor surface, an attaching stud for attaching the caster to the chair, and a flexible conductor attached to the caster body, the flexible conductor including a contact head which electrically contacts the flexible conductor to the floor surface, a spring which pushes the contact head into electrical contact with the floor surface, a ball chain attached to the caster body which prevents the contact head from extending away from the caster body more than a predetermined distance, and a connecting means for electrically connecting the flexible conductor to the chair.

19 Claims, 1 Drawing Sheet

4,934,022

CONDUCTIVE CASTER

BACKGROUND

This invention relates to mobile work stations such as for assembly, testing and operation of sensitive electronic devices. More particularly, the invention relates to a caster for a wheeled vehicle, such as a chair or a cart, which safely discharges static electricity and is suitable for use in a clean-room environment.

Many electronic devices can be easily damaged by discharges of static electricity, especially during manufacture and assembly. To prevent such damage, electrically conductive wheeled vehicles have been developed to provide a discharge path to ground potential in order to prevent the buildup of any static electricity. For example, an electrically conductive wheeled vehicle is disclosed in U.S. Pat. No. 4,747,011 for an anti-static chair, which is incorporated herein by this reference.

A problem associated with such wheeled vehicles is that it is difficult to provide sufficient electrical contact between the wheeled vehicle and a source of electrical ground, such as a floor surface. The electrical contact is typically provided through the casters of the wheeled vehicle.

A conventional way of providing such contact is to make the wheels of the casters out of conductive material, as is disclosed in U.S. Pat. No. 4,747,011. However, with such a construction of the casters, the dust resulting from wear of the casters is conductive. Accumulations of conductive dust on a floor surface of a cleanroom environment are undesirable because electrically charged dust particles can cause damage to the electrical devices in the work station environment. A further problem occurs when the caster wheels are made of carbon. The carbon tends to leave black smudges on the floor surface.

Other means of providing contact between one or more casters of the wheeled vehicle and the floor surface have been developed. One such means includes a conductive sphere attached to one end of a conductive spring, with the other end of the spring mounted to a frame member of the caster. A wire segment is attached to the spring at one end of the segment. Another end of the wire segment is attached to the body of the caster by a metal staple which is in electrical contact with the conductive mounting of the caster. During operation of the wheeled vehicle, the spring pushes the sphere against the floor surface thus providing the necessary contact with a source of electrical ground.

A disadvantage of the spring/sphere conducting means described above is that the sphere can become lodged in an opening in the floor surface, such as a crack or a separation between two slabs of concrete. The sphere can also be snagged by a carpet loop. The spring then tends to become stretched beyond its capacity to recoil. The distended spring is unsightly and no longer pushes the sphere against the floor surface and effective electrical contact is thereby diminished or lost. Moreover, the distended spring can become entangled with the caster wheels.

Another disadvantage of the spring/sphere conducting means is that it is comparatively expensive and complex to make. A relatively complex frame member is required for mounting the spring and wire segment on the caster. In addition, the spring must be tightly wound to provide adequate recoiling capacity and must be stretched slightly to provide sufficient contact with the floor. Moreover, the sphere is difficult to attach to the spring and therefore must be constructed with a special attachment piece.

Accordingly, there is a need for a conducting caster for use in connection with a conducting wheeled vehicle that does not easily become distended or broken and is simple and inexpensive to make.

SUMMARY

The present invention is directed to an electrically conducting caster for grounding a wheeled vehicle that meets the foregoing needs. The caster includes a rigid caster body; wheel means, attached to the caster body, for movably supporting the caster body so that the caster body stays at a predetermined distance from a support element; attaching means for attaching the caster body to the wheeled vehicle; and a flexible conductor attached to the caster body. The flexible conductor has a contact head for electrically contacting the flexible conductor with the support element; biasing means for pushing the contact head into electrical contact with the support element; limiting means connected between the caster body and the contact head for preventing the contact head from extending away from the caster body more than a predetermined length substantially less than a fully extended length of the biasing means; and connecting means for electrically connecting the flexible conductor to a conducting apparatus on the wheeled vehicle.

The wheeled vehicle can comprise a chair and the support element can include a floor surface. The biasing means can include a spring and the limiting means can comprise a ball chain. The spring can be electrically conducting and can serve as the part of electrical connection between the wheeled vehicle and the floor surface. The ball chain can also be electrically conducting and serve as part of the electrical connection between the wheeled vehicle and the floor surface.

DRAWINGS

Figure 2:
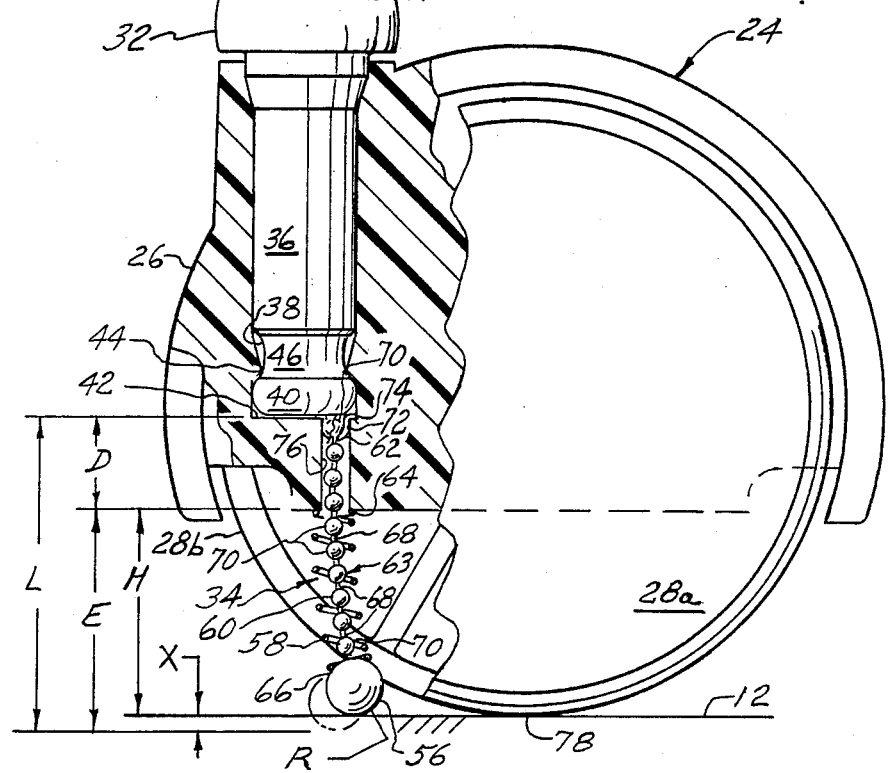

These and other features, aspects, and advantages of the present invention will become better understood with reference to the following description, appended claims, and accompanying drawings, where:

FIG. 1 is a front elevational view of a wheeled chair having casters according to the present invention; and FIG. 2 is a partial cross sectional view of one of the casters of FIG. 1 taken along line 2—2 in FIG. 1.

DESCRIPTION

With reference to FIGS. 1 and 2, a wheeled chair 10, resting on a floor surface 12 as a support element for the chair 10, includes a seat 14 and a back 16, both of which are padded. The seat 14 and the back 16 each serve as supporting members for an occupant of the chair, each being supported by a seat post assembly 17 that extends upwardly from a base frame 18 of the chair 10.

The seat 14 has a seat conductive element 19 and the back 16 has a back conductive element 20. The conductive elements 19 and 20 are electrically connected to a conducting apparatus 22 of the chair 10. The conducting apparatus 22 can include a series of elements between the conductive elements 19 and 20 and a conducting caster 24, forming portions of the seat post assembly 17 and frame members 25, as described in considerable detail in the above-referenced U.S. Pat. No. 4,747,011. The conducting elements 19 and 20 are electrically connected to the floor surface 12 through the conducting apparatus 22 and the conducting casters 24.

According to the present invention, each caster 24 includes a rigid caster body 26, a pair of wheels 28 rotatably mounted to the body 26 in a conventional manner and designated as first wheel 28a and second wheel 28b, a vertically extending, rotatably mounted attaching stud 32, and a flexible conductor 34, further described below.

A lower stud portion 36 of the stud 32 extends into a stud hole 38 in the caster body 26. The stud 32 is removably retained in a conventional manner in the stud hole 38 by a stud head 40 of the stud 32 engaging a securing portion 44 of the stud hole 38.

The caster body 26 rotates freely relative to the attaching stud 32. Grease or other lubricant can be provided on the lower stud portion 36 to facilitate rotation.

An upper stud portion 48 of the attaching stud 32 fits into a sleeve 50 which is vertically oriented and rigidly connected proximate an end 51 of the frame member 25. The upper stud portion 48 is secured within the sleeve 50 by means of an annular securing spring 52. The spring 52 has ends which are forced together, as illustrated at 54, when the upper stud portion 48 is inserted into the sleeve 50. The outward force of the spring 52 against the side wall of the sleeve 50 holds the upper stud portion 48 in place. There are many alternative ways of mounting the casters 24 to the frame 18 well known to those skilled in the art. For example, the upper stud portion 48 can be threadedly attached to the frame 18.

The flexible conductor 34 includes a contact head 56, a biasing spring 58, a ball chain 60, and a connecting element 62. The ball chain 60 and the connecting element 62 form a limiting means 63. The contact head 56 is a hollow metal sphere with holes at opposite ends and a slit from one hole to the other. The contact head 56 is attached to one end of the ball chain 60 by inserting the lowermost ball 70 into the contact head 56 which is open along the slit and squeezing the contact head 56 to close it around the lowermost ball 70 in the ball chain 60.

The biasing spring 58 is a helical spring which presses against the caster body 26 at a first spring end 64 and against the contact head 56 at a second spring end 66. The tension of the spring 58 against the contact head 56 keeps the head 56 in contact with the floor surface 12. The spring 58 is relatively simple and inexpensive because the stress on it during operation of the chair 10 is minimal. The reason for this is that the ball chain 60 will not extend beyond a predetermined length.

In place of the helical spring 58 a leaf spring can be provided. For example, a C-shaped leaf spring could be provided with a lower end in contact with the contact head 56 and an upper end in contact with the caster body 26. The C-shaped leaf spring could also be riveted to the caster body 26 so the leaf spring does not rotate against the caster wheels 28. Alternatively, an S-shaped leaf spring could be provided with one end in contact with the contact head 56 and the other end attached to the caster body 26 by a screw or rivet.

The ball chain 60 comprises links 68 and balls 70. The ball chain 60 has a minimum length of a total of the diameters of the balls 70 and a maximum length of the total of the diameters of the balls 70 and the lengths of the links 68.

The connecting element 62 is a bell-shaped pendant or sleeve having a hole in its lower portion. The diameter of the hole is substantially less than the diameter of the balls 70 of the ball chain 60 and greater than the diameter of the links 68. The uppermost ball 70 of the ball chain 60 fits into the connecting element 62 thereby securing the ball chain 60 to the connecting element 62. The contact element 62 can have a slit in the contact element side wall 72 so that the uppermost ball 70 on the ball chain 60 can be easily inserted into the contact element 62.

The connecting element 62 is supported by the caster body 26 at an annular lip 74 of the connecting element 62. The connecting element 62 rests on the bottom of the stud hole 38 and is in secure contact with the stud head 40 by virtue of axial loading of the stud 32 when the caster 24 is weighted by the chair 10 The axial loading of the stud 32 provides for reliable electrical contact between the flexible conductor 34 and the chair 10. Thus the connecting element 62 electrically connects the flexible conductor 34 to the conducting apparatus 22. In the embodiment illustrated in the drawings, the attaching stud 32 engages a sleeve 50 of the frame 18, the sleeve 50 forming part of the conducting apparatus 22.

The foregoing construction of the flexible conductor 34 allows the contact head 56 to rotate with respect to the ball chain 60. It also allows for the ball chain 60 and the contact head 56 to rotate with respect to the connecting element 62. As a result, the flexible conductor is less likely to become lodged in a crack in the floor surface 12 or snagged by a carpet loop on the floor surface 12.

Various sizes of ball chains, hollow metal spheres for the contact head 56, and pendants or sleeves for the connecting element 62 can be purchased from Ball Chain Manufacturing Company, Inc. of Mount Vernon, N.Y. The ball chain 60 can be Standard Ball Chain No. 3, the contact head 56 can be the Hollow Ball with a diameter of 3/16 inches, and the connecting element 62 can be Part No. 6-P (Detachable Pendant), all of Ball Chain Manufacturing Company, Inc. Other sizes and types of the foregoing parts can also be used.

When the flexible conductor 34 is assembled, the ball chain 60 extends downwardly from the connecting element 62 through a chain hole 76 in the caster body 26. The fully extended length of the flexible conductor is indicated by the designation L. The length L of the flexible conductor 34 is such that the flexible conductor 34 can, when fully extended, extend a distance X below the floor surface 12. This provides for reliable contact between the contact head 56 of the flexible conductor 34 and the sometimes uneven floor surface 12. The distance X can be approximately the diameter of the contact head 56. The biasing spring 58 pushes the contact head 56 against the floor surface 12, as the spring 58 tensions the chain 60 for maintaining conductivity in the chain 60.

As shown in FIG. 2, the wheels 28 extend a predetermined distance H from the lower end of the caster body 26, thereby maintaining the distance X at a constant. This provides for better electrical contact between the contact head 56 and the floor surface 12. The distance X can be made to be very small so that the contact head 56 does not drop very far into a crack in the floor surface 12.

The ball chain 60 is constructed such that the flexible conductor 34 does not extend beyond the length L, as is evident from the illustration of the ball chain 60 in FIG. 2. Therefore, if the contact head 56 becomes lodged in a crack or snagged by a carpet loop, the limiting means 63 prevents the biasing spring 58 from being extended beyond the length L from which it can recoil into its original position. If the contact means of the flexible conductor 34 was attached to the spring 58 without the limiting means 63, the spring 58 could become distended beyond its ability to retract into its original position when the contact head 56 becomes lodged or snagged in the floor surface 12.

The contact head 56, the ball chain 60, and the connecting element 62 can all be made of suitable electrically conductive material such as brass, steel, including stainless steel, or aluminum. The biasing spring 58 can be made of steel. The contact head 56 and the connecting element 62 are preferably constructed of electrically conductive, corrosion-resistant material. However, the biasing spring 58 and/or the ball chain 60 can be constructed of nonconductive material. There should be an electrically conductive path between the contact head 56 and the connecting element 62, but there is no requirement that the conductive path be provided by the ball chain 60 or the biasing spring 58. A separate conductive member between the contact head 56 and the connecting element 62 could provide the conductive path. Alternatively, either the spring 58 or the chain 60 could provide the path. If the spring 58 provides the only conductive path, an electrical connection between the spring 58 and the attaching stud 32 must be provided.

The caster body 26 and the wheels 28 and 30 can be made of conventionally-used nonconductive hard plastic. The caster body 26 can be made of steel when the spring 58 provides the conductive path from the contact head 56 to the attaching stud 32. The attaching stud 32 can be made of conductive metal, such as steel.

The manufacture and assembly of the caster 24 described herein is simple and inexpensive. As indicated above, the contact head 56, the ball chain 60, and the conducting element 62 are available in the present market. The spring 58 is also presently available from numerous market sources, as is well known to those skilled in the art. Finally, the other parts of the caster 24, including the caster body 26, the wheels 28, and the attaching stud 32, are available in an assembled form from numerous market sources well-known to those skilled in the art.

The only alteration that needs to be made to a conventional caster in fabricating the caster 24 is to drill the chain hole 76 in the caster body 26. The caster 24 with the flexible conductor 34 can be assembled by (1) installing the uppermost ball 70 of the ball chain 60 into the connecting element 62; (2) inserting the lower portion of the ball chain 60 down through the chain hole 76; (3) seating the connecting element 62 on the bottom wall of the stud hole 38; (4) slipping the spring 58 over the lower portion of the ball chain 60; (5) installing the lowermost ball 70 of the ball chain 60 into the contact head 56; and (6) installing the attaching stud 32 into the stud hole 38. The caster 24 can then be attached to the frame member 25 by engagement of the stud 32 with the sleeve 50 or by another means well known to those skilled in the art.

Alternatively, the flexible conductor 34 can be installed by taking a long piece of ball chain from a roll and inserting it up through the chain hole 76 and the stud hole 38. Steps (1) and (3) above are then performed. The long ball chain is then cut to a suitable length. Finally, steps (4) through (6) above are accomplished.

The support element as described above in the drawing is the floor surface 12. However, other elements can provide source to electrical ground. For example, the floor surface 12 can have conductive floor mats made of materials such as vinyl laced with carbon. Also, the supporting element can be different from an element providing electrical contact with the flexible conductor 34, such as a contact strip that is positioned to one side of a prescribed path (e.g., a rail) on the floor surface 12. In this instance, the flexible conductor 34 could extend horizontally from the caster body 26 to the contact strip.

Although the present invention has been described in considerable detail, other versions and embodiments of the invention are possible. Therefore, the present invention is not limited to the embodiment described herein, but is instead defined by the spirit and scope of the appended claims.

What is claimed is:

1. An electrically conductive caster for grounding a wheeled vehicle having a conducting apparatus, the caster comprising:
    (a) a rigid caster body;
    (b) wheel means attached to the caster body for movably supporting the caster body on a support element;
    (c) attaching means for attaching the caster body to the wheeled vehicle;
    (d) a flexible conductor attached to the caster body and comprising:
        (i) a contact head for electrically contacting the flexible conductor with the support element;
        (ii) biasing means for pushing the contact head into electrical contact with the support element, the biasing means being capable of advancing the contact head a maximum biasing distance from the caster body; and
        (iii) limiting means, connected between the caster body and the contact head for preventing the contact head from extending away from the caster body more than a predetermined limiting distance from the caster body, the limiting distance being less than the maximum biasing distance; and
    (e) connecting means for electrically connecting the flexible conductor to the conducting apparatus.

2. The caster of claim 1 wherein the limiting means is electrically conducting and is electrically connected to both the connecting means and the contact head.

3. The caster of claim 1 wherein the biasing means is electrically conducting and is electrically connected to both the connecting means and the contact head.

4. The caster of claim 1 wherein the supporting element includes a floor surface.

5. The caster of claim 1 wherein the wheel means includes first and second wheels on opposite sides of the caster body.

6. The caster of claim 5 wherein the flexible conductor extends downwardly between the first and second wheels.

7. The caster of claim 1 wherein the biasing means includes a spring.

8. The caster of claim 7 wherein the attaching means is pivotally attached to the wheeled vehicle.

9. The caster of claim 1 wherein the wheeled vehicle comprises a chair.

10. The caster of claim 1 wherein the limiting means comprises a ball chain.

11. The caster of claim 1 wherein the contact head comprises a metal ball.

12. The caster of claim 1 wherein the wheel means is nonconducting.

13. The caster of claim 1 wherein the caster body stays at a predetermined body distance from the support element.

14. The caster of claim 13 wherein the predetermined body distance is less than the limiting distance.

15. A grounded wheeled vehicle comprising: a supporting member including a conductive element proximate the user of the vehicle; a conducting apparatus for electrically connecting the conductive element to a source of ground potential; and an electrically conductive caster comprising:
 (a) a rigid caster body;
 (b) wheel means attached to the caster body for movably supporting the caster body at a predetermined body distance from a floor surface;
 (c) attaching means for attaching the caster body to the chair;
 (d) a flexible conductor attached to the caster body comprising:
  (i) a contact head for electrically contacting the flexible conductor with the floor surface;
  (ii) biasing means, between the contact head and the caster body, for pushing the contact head into electrical contact with the floor surface; and
  (iii) limiting means, attached to the caster body and the contact head, for preventing the contact head from extending away from the caster body more than a predetermined limiting distance not more than a predetermined maximum length to which the biasing means can extend the contact head without damage to the biasing means; and
 (e) connecting means for electrically connecting the flexible conductor to the conducting apparatus.

16. The vechicle of claim 15 wherein the supporting member is a seat.

17. The vechicle of claim 15 wherein the supporting member is a back support.

18. The vechicle of claim 15 wherein the supporting member is a seat and a back support.

19. A wheeled chair for discharging a static electrical charge carried by an occupant of the chair, the chair comprising: a supporting member comprising a conductive element proximate a user of the chair; a conducting apparatus for electrically connecting the conductive element to a source of ground potential; and an electrically conductive caster comprising:
 (a) a rigid caster body;
 (b) wheel means attached to the caster body for movably supporting the caster body at a predetermined body distance from a floor surface;
 (c) attaching means for attaching the caster body to the chair;
 (d) a flexible conductor attached to the caster body comprising:
  (i) a contact head for electrically contacting the flexible conductor with the floor surface;
  (ii) a spring means, between the contact head and the caster body, for pushing the contact head into electrical contact with the floor surface; and
  (iii) a ball chain, attached to the caster body and the contact head, for preventing the contact head from extending away from the caster body more than a predetermined limiting distance not more than a predetermined maximum length to which the spring means can push the contact head from the caster body without permanent deformation of the spring means; and
 (e) connecting means for electrically connecting the flexible conductor to the conducting apparatus.

* * * * *